United States Patent [19]

Markowski

[11] 4,145,878
[45] Mar. 27, 1979

[54] VORBIX AUGMENTER CONFIGURATION

[75] Inventor: Stanley J. Markowski, East Hartford, Conn.

[73] Assignee: United Technologies Corp., Hartford, Conn.

[21] Appl. No.: 861,033

[22] Filed: Dec. 15, 1977

[51] Int. Cl.² ............................. F02K 3/10; F02C 7/22
[52] U.S. Cl. ......................................... 60/261; 60/262; 60/39.74 R
[58] Field of Search ....................... 60/261, 262, 39.71, 60/39.74 R, 39.65, 226 R

[56] References Cited

U.S. PATENT DOCUMENTS

| 2,443,250 | 6/1948 | Johnson | 60/262 |
| 2,934,889 | 5/1960 | Poulos | 60/226 R |
| 3,830,431 | 8/1974 | Schwartz | 60/262 |
| 3,872,664 | 3/1975 | Lohmann et al. | 60/39.65 |
| 3,930,370 | 1/1976 | Markowski et al. | 60/262 |
| 3,999,378 | 12/1976 | Tatem et al. | 60/39.65 |

Primary Examiner—Robert E. Garrett
Attorney, Agent, or Firm—Charles A. Warren

[57] ABSTRACT

An arrangement for mixing fan air and engine gas in an engine augmenter which includes transition ducts for diverting some of the fan air into the engine gas annulus, the ducts having vortex generators to create secondary flows that will improve mixing and permit use of shorter augmenters.

6 Claims, 3 Drawing Figures

VORBIX AUGMENTER CONFIGURATION

BACKGROUND OF THE INVENTION

Afterburner or augmentation downstream of the engine requires a relatively long duct in order to accomplish complete combustion. This is especially true in ducted fan engines in which the hot engine gas discharging in an annulus from the engine is surrounded by the cooler ducted fan air. Combustion rates differ in the two different streams and combustion efficiency is reduced unless the two streams are well mixed.

SUMMARY OF THE INVENTION

A feature of the invention is a mixing of the fan air with the engine gas utilizing transition ducts and vortex generators upstream of the combustion zone. Another feature is the delivery of the fuel to the engine gas upstream of the mixing devices to distribute the fuel more uniformly across the duct and in a position to mix with the vortices. In this way the combustion zone may be significantly shorter.

According to the present invention, a plurality of transition ducts terminating in vortex generators guide a part of the fan air into the engine gas annulus, and these ducts terminate in vortex generators arranged so that alternating ducts have oppositely rotating vortices. Around these ducts the engine gas is guided to flow around the ducts and past the ends of the ducts to be mixed with the vortices. By this arrangement, the vortices are immersed in the engine gas which carries with it the vaporized fuel for combustion.

The invention contemplates two series of transition ducts, one directing a part of the air into the engine gas path and the other series directing the rest of the air along the fan air path with vortex generators creating oppositely swirling vortices in adjacent ducts for more complete mixing with the engine gas flowing around the transition ducts and past the ends of the transition ducts.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
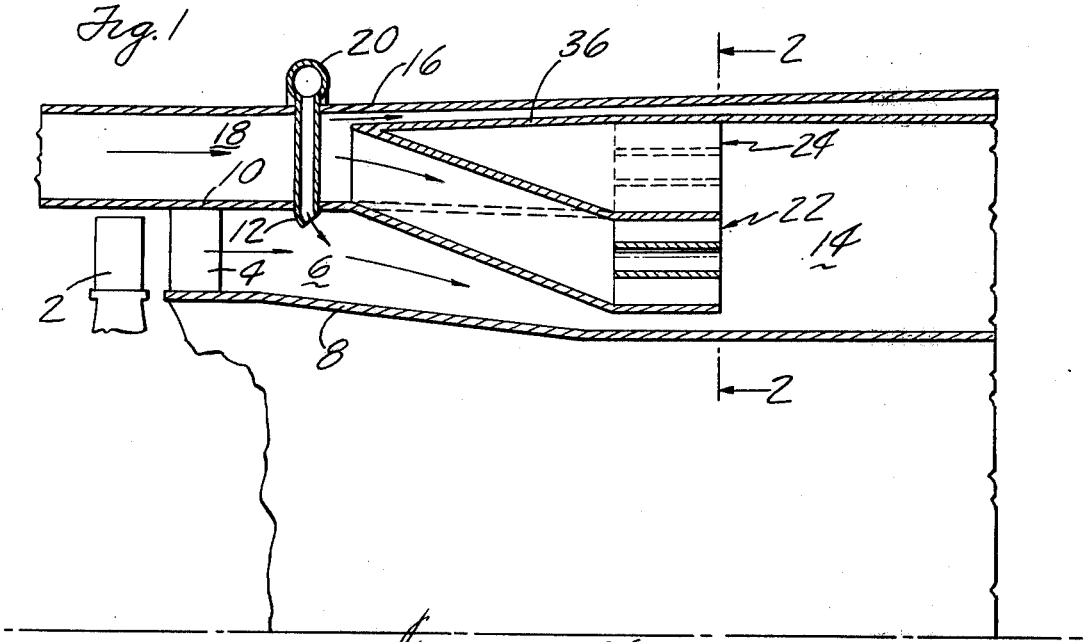
FIG. 1 is a sectional view through the discharge duct for a fan engine.
Figure 2:
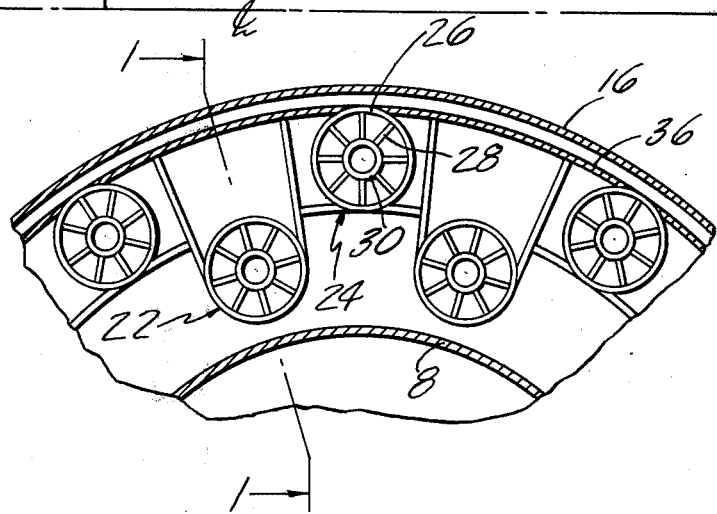
FIG. 2 is a sectional view along line 2—2 of FIG. 1.

Referring first to FIG. 1, the engine gas is delivered from the last rotor stage 2 of the turbine past stator vanes 4 into the engine exhaust passage 6 defined between the tail cone 8 and the intermediate surrounding duct wall 10. This passage is an annulus and a row of fuel nozzles 12 in the duct wall 10 deliver fuel into this annulus to mix with the gas and burn to produce more thrust from the gases discharging from the thrust nozzle. This nozzle, not shown, is located at the downstream end of the combustion chamber 14.

Surrounding the duct 10 is the fan air duct 16 defining an annular passage 18 for the fan air passing around the engine. This duct 16 extends downstream to a point beyond the end of the tail cone and defines the combustion chamber 14 therebetween. The thrust nozzle is mounted at the end of this duct 16. For convenience the fuel nozzles 12 extend across the passage 18 as shown and are supplied from a fuel manifold 20.

To improve mixing of the fan air with the engine gas for a more uniform combustion thereby augmenting the resultant engine thrust, a plurality of transition ducts 22 and 24 extending generally axially are positioned with their upstream open ends, which are truncated sector in shape, located in the passage 18 to receive the fan air therein. Alternate ducts 22 extend at an acute angle toward the axis of the engine in a downstream direction with their open circular downstream ends terminating generally in the path of the engine gas. The other ducts 24, between adjacent ducts 22, extend generally axially and terminate with their open circular discharge ends in the path of the fan air. All the discharge ends are in substantially the same transverse plane and each open circular end has a vortex generator 26 therein.

Each generator 26 is essentially a row of swirl producing vanes 28 extending inwardly from the end of the transition duct which serves as an outer shroud to an inner supporting ring 30. The ring 30 is open so that air or gas flowing therethrough receives no swirl. The upstream ends of the transition ducts extend across the passage 18 and their outer edges are close to the outer duct wall 16 and are attached at the downstream end of duct wall 10, the latter terminating just downstream of the fuel nozzles. Preferably the open upstream ends of these transition ducts substantially fill the fan air passage so that practically all of the fan air enters these ducts.

Figure 3:
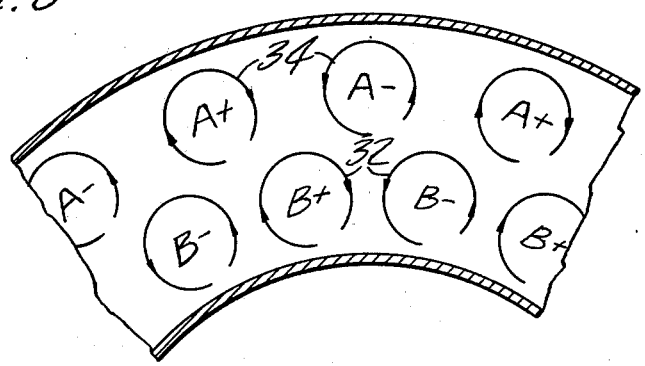
FIG. 3 is a diagram showing the directions of the vortices in the contiguous ducts.

Alternating ducts 22 that terminate near to the tail cone have the vanes in opposite directions to produce alternating clockwise and counterclockwise vortices as shown by the arrows 32 in FIG. 3. Similarly the vanes in ducts 24 are arranged in the same manner to produce alternating vortices as represented by the arrows 34. It will be noted that the open ends of all the transition ducts terminate in spaced relation to the adjacent duct wall or tail cone so that engine gas may flow past the entire peripheries of these discharge ends of the transition ducts.

With the arrangement of the transition ducts in this manner, the hot engine gas with fuel from the nozzles mixed therein flows around these ducts and discharges around and on all sides of the open ends of the transition ducts thereby completely surrounding each vortex with hot vaporized fuel in the hot engine gas and mixing with these vortices to produce nearly a uniform combustible mixture across the entire diameter of the combustion chamber. The secondary flows resulting from these vortices produce rapid mixing of the fan air with the fuel carrying engine gas so that complete combustion occurs in a relatively short combustion space.

The outer duct 16 may have a liner 36 in closely spaced relation to the duct wall so as to receive a flow of cooling air from the fan air passage for protecting the duct 16 from heat damage. When this liner is used its upstream end is adjacent to the upstream ends of the transition ducts and, in this event, these transition ducts may be secured at their upper ends to the liner. The downstream ends of these transition ducts will desirably be spaced inwardly of this liner 36 as shown. The attachment of the liner to the surrounding duct 16 may be accomplished in any well known manner. This structure as well as the support of the ducts around the engine are so well known as to require no detailed description.

Although the alternating vortices as above described are the preferred embodiment, it will be understood that for convenience, all the ducts 22 may have one direction of vortex; and the ducts 24, the opposite direction. In many instances, the mixing of the air and gas would be adequate for the purpose. Obviously, it is desirable to proportion the circular downstream ends of the transition ducts to the total flow area between the tail cone and the outer wall 16 so that there will be no detrimental pressure difference between the two flows. Essentially, these transition ducts are so arranged that their discharge ends are at different radial positions at the upstream end of the combustion chamber to improve the mixing of the fan air with the engine gas.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An augmenter construction for a fan engine including:
   an engine gas exhaust passage defined by a tail cone and a surrounding duct wall;
   a surrounding annular fan air passage defined by said duct wall and a surrounding outer wall;
   a plurality of transition ducts having their open inlet ends in the fan air passage, and their downstream ends staggered to terminate at different radial positions in the space between the tail cone and the outer wall; and
   vortex generators in the downstream ends of said transition ducts.

2. An augmenter construction as in claim 1 including fuel injectors for delivering fuel to the upstream end of the exhaust passage.

3. An augmenter construction as in claim 1 in which alternate transition ducts have their discharge ends adjacent to the tail cone with the other ducts truncating adjacent to the outer wall.

4. An augmenter construction as in claim 1 in which the vortex generators in adjacent ducts produce vortices in opposite directions.

5. An augmenter construction as in claim 1 in which the duct wall terminates at a point adjacent the upstream ends of the transition ducts.

6. An augmenter construction as in claim 1 in which the open discharge ends of the transition ducts are spaced from one another and the adjacent walls force flow of engine gas around them.

* * * * *